Patented Feb. 19, 1946

2,395,153

UNITED STATES PATENT OFFICE 2,395,153

CATALYTIC CRACKING

Charles L. Thomas and Jacob E. Ahlberg, Riverside, Ill., assignors to Universal Oil Products Company, Chicago, Ill., a corporation of Delaware No Drawing. Application February 2, 1944, Serial No. 520,782

10 Claims. (Cl. 196—52)

This is a continuation-in-part of our co-pending application Serial No. 386,122 filed March 31, 1941, which in turn is a continuation-in-part of our application Serial No. 288,579 filed August 5, 1939, which in turn is a continuation-in-part of our application Serial No. 236,549, filed October 22, 1938, now issued into Patent No. 2,285,314 on June 2, 1942.

This invention relates to a process for the conversion of hydrocarbon oil in the presence of highly active catalysts prepared in the manner hereinafter disclosed.

More specifically, the present invention is concerned with the use of a silica-alumina catalyst prepared by adding a solution of aluminum salt to a purified silica gel to precipitate alumina by hydrolysis.

In one embodiment, the present invention relates to the conversion of hydrocarbon oils heavier than gasoline into substantial yields of gasoline which comprises contacting said oil at cracking conditions with a catalyst prepared by adding a solution of aluminum salt to a purified precipitated silica to hydrolytically absorb aluminum ions in said silica, thereafter forming alumina within said silica gel, preferably by heating, and removing the cracked products.

We have found that the alumina-silica catalysts which are employed in this invention are rendered much more stable over long periods of use and also are more active and selective in accelerating gasoline-forming reactions in cracking when the originally precipitated hydrated silica which forms a primary material on which the precipitated alumina is subsequently disposed is substantially free of alkali metal ions. The purification treatment which constitutes one of the features of our invention is described later in more detail. The character and efficiency of the alumina-silica catalysts employed in this invention will vary more or less with the exact conditions of preparation, purification, and ratio of alumina to silica. For example, one preparation may furnish catalysts best suited for use in the cracking of heavy hydrocarbon fractions while another may be better adapted in reforming hydrocarbons substantially within the gasoline boiling range.

In the catalyst thus prepared, the ratio of silica to alumina by weight may range from 10:1 to 100:1 or greater. However, catalysts have been prepared in which the ratio is as high as 500:1.

An important feature of our invention resides in the fact that catalysts of greatly increased stability and efficiency in cracking reactions are produced when there is substantially complete exclusion of alkali metal ions from the hydrated alumina-silica masses. In the present invention a precipitated hydrated silica gel substantially free from alkali metal ions is used as the primary material or base for the subsequent deposition of hydrated alumina. Silica gel free from alkali metal ions may be prepared by the hydrolysis of silicon tetrachloride, for example, but in the more usual method the hydrated silica gel will be prepared by the acidification of alkali metal silicates, whereby alkali metal ions unavoidably incorporated into the silica gel are removed subsequently therefrom. It is not positively known whether the alkali metal compounds, such as those of sodium, are present in chemical combination or in an adsorbed state, but it has been definitely determined that their exclusion or removal is necessary if catalysts of superior activity and stability are to be obtained. It may be that the presence of these alkali metal ions causes a sintering or fusion of the surfaces of the primary composites of the catalytic material at elevated temperatures so that the porosity of the catalyst particles is reduced or altered with a corresponding reduction in effective surface, considering the catalytic effects to be due at least in part to surface action. However, such concepts are principally speculative in view of the difficulty of obtaining direct confirmatory evidence.

Several alternative purification methods are applicable to primary hydrated silica gels prepared by the acidification of alkali metal silicate solutions to insure the substantially complete absence of sodium or other alkali metal ions. One method consists in treating and washing the precipitated silica gel with acidic solutions to extract alkali metal impurities incorporated into the silica gel during its preparation. Thus a precipitated silica gel may be first washed with water to remove a major portion of the soluble impurities and subsequently treated with a mineral acid, for example, such as hydrochloric acid and water to remove the alkali metal ions. As an alternative purification method the primary precipitated hydrated silica may be treated with ammonium compounds or salts, such as ammonium chloride in solution or other halides, the sulfate, the nitrate, the phosphates, or acetate, so that alkali metal ions will not be substantially present in the primary gel when it has been suitably washed. Whether the alkali metal ions are present in the hydrated silica gel in a chemically combined or absorbed condition, the alkali metal ions may be replaced by the ammonium ions which will be later expelled from combination or adsorption in subsequent treatment at elevated temperature.

Another alternative method for removing alkali metal ions from the precipitated hydrated silica gel consists in treating with salts of multivalent metals which may replace the sodium or other alkali metals in the manner similar to that described in the case of ammonium compounds. For example, a primary gel having large amounts of alkali metal compounds present may be treated with a solution of salts of multivalent metals, more particularly aluminum, in which the metal forms the positive ion of the salt being used. In this mode of operation the multivalent metal used to replace the alkali metal ions is introduced into the catalytic material and is not removed at elevated temperatures as is the ammonium above described. When this method of purification is used, it is not necessary to add any additional alumina to produce a catalyst obtained by hydrolytic adsorption since sufficient amount is retained during the purification treatment to form a highly active composite of silica and alumina upon calcination. However, more alumina can be added if desired. Whatsoever the purification method used, purified hydrated primary gels have been prepared by all the methods above described and substantially alkali metal-free alumina has been added with further processing according to the present invention to form catalysts suitable for hydrocarbon reactions.

The purified precipitated silica gel is then added to a solution of aluminum salt and the alumina precipitated by hydrolysis, preferably by heating. For example, the purified silica may be slurried in an aluminum chloride solution and thoroughly mixed, the excess liquid drained by filtration and the filter cake heated up to a temperature of about 300° F., and dried. If desired, the mixture of aluminum salt solution and purified precipitated silica gel may be heated before filtration to speed the hydrolysis reaction. In still another modification a silica gel may be admixed with the aluminum salt solution and the entire mixture heated to evaporate the water and to hydrolyze the aluminum salt to form alumina. After the alumina has been deposited upon the purified hydrated silica gel, the entire mass may be dried at a temperature of the order of 240 to 300° F. more or less, after which it may be pressed and sized to recover particles of the convenient average size or formed into desired shapes by compression methods. Alternatively, the silica gel may be formed into spheres and the alumina deposited thereon in accordance with the present invention.

It has been found that after the usual drying treatment the material usually has a total water content of approximately 15 per cent which appears to correspond to the best workability of the material. By calcining the particles at temperatures of the order of 850–1000° F., or higher, maximum activity of the catalyst is obtained and a further dehydration occurs.

Catalysts prepared by the above general procedure evidently possess a large total contact surface corresponding to a high porosity, the pores being of such size that hydrocarbon oil vapors are able to penetrate to a considerable distance and yet not so small that when the pores become clogged with carbonaceous deposits after a long period of service, they are difficult to reactivate by oxidation. This structure is also retained after many alternate periods of use and reactivation as evidenced by the fact that the catalyst may be repeatedly reactivated by passing air or other oxidizing gas over the spent particles to burn off deposits of carbonaceous material at temperatures as high as 1400 to 1600° F. without material loss of catalytic activity. According to the present process catalysts prepared by the general procedure described in the preceding paragraphs are utilized to advantage in cracking reactions when employed as filling material in tubes or chambers in the form of small pellets or granules or the catalyst in the finely divided form may be employed in "fluidized" or "moving bed" types of operation.

In the fluidized operation the hydrocarbons are passed upwardly through a body of finely divided catalyst at sufficient velocity to fluidize the catalyst particles and form a fluid-like body of catalyst particles which are transferred between the reaction and regeneration zones in a fluidized state.

In the moving bed type of operation, the compact bed may be passed either downwardly or upwardly through the reaction zone and regeneration zones.

In the example given below, wherein hydrocarbon fractions readily vaporizable at moderate temperatures without extensive decomposition are employed, the average particle size is within the range of 6 to 10 mesh, which may apply either to small pellets of uniform size and short cylindrical shape or to particles of irregular size and shape produced by the grinding and sizing of the partially dehydrated materials.

The general procedure in cracking with the catalysts of this invention involves contacting the heated hydrocarbonaceous material with the catalyst, fractionating the cracked products, and recycling of insufficiently converted hydrocarbons, if desired. In using these catalysts, moderate temperatures, relatively low pressures and high throughputs are to be expected in comparison with the strictly thermal cracking processes in use at the present time.

The following example of preparation of catalyst peculiar to the present invention is given to indicate its novelty and utility although not for the purpose of limiting the invention in exact agreement with the data introduced.

390 cc. of concentrated hydrochloric acid in 1815 cc. of solution was added to 568.4 grams of sodium silicate ($Na_2SiO_3.H_2O$) in 3000 cc. of water which gave a liquid suspension which was definitely acidic to blue litmus. The filter cake was then slurried in 2½ liters of water and filtered, this washing treatment being repeated several times. The filter cake was slurried in 2½ liters of water after which ⅛ equivalent of hydrochloric acid in 50 cc. of water was added. The precipitate was filtered and this treatment again repeated. The filter cake was slurried in water and water washing treatment repeated 4 times when the wash water was practically free from alkali metal salts. The purified silica was then slurried in 40.24 grams of aluminum chloride hexahydrate dissolved in 4000 cc. of water. The excess liquid was then drained by filtration and the filter cake dried at approximately 300° F. The dried material was then pressed and sized into 6–10 mesh particles and subsequently calcined at approximately 932° F.

Using a Pennsylvania gas oil as charging stock, a yield of 26.3% by volume of 400° F. end point gasoline was obtained in a once through operation, the octane number of the gasoline being 78.8. There was also produced 5.9% by volume of the original charge of readily polymerizable 3 and 4 carbon atom olefins.

We claim as our invention:

1. A conversion process which comprises contacting normally liquid hydrocarbon oil under cracking conditions with a catalyst produced by precipitating hydrated silicon dioxide containing alkali metal, washing the precipitated silica, containing said alkali metal, with an aqueous solution of a compound having a cation capable of replacing alkali metal ions, separating the silica from the washing solution, thereafter commingling the thus purified silica in undried condition with an aluminum salt solution and depositing aluminum oxide on the silica by hydrolysis of said salt, and drying the resultant silica-alumina composite to remove the major portion of its water content.

2. A conversion process which comprises contacting normally liquid hydrocarbon oil under cracking conditions with a catalyst produced by precipitating hydrated silicon dioxide containing alkali metal, washing the precipitated silica, containing said alkali metal, with an aqueous solution of a compound having a cation capable of replacing alkali metal ions, separating the silica from the washing solution, thereafter commingling the thus purified silica in undried condition with an aluminum salt solution and heating the mixture sufficiently to hydrolyze said salt and deposit aluminum oxide on the silica, and drying the resultant silica-alumina composite to remove the major portion of its water content.

3. The process as defined in claim 1 further characterized in that said compound is a mineral acid.

4. The process as defined in claim 1 further characterized in that said aqueous solution comprises hydrochloric acid.

5. The process as defined in claim 2 further characterized in that said compound is a mineral acid.

6. The process as defined in claim 2 further characterized in that said aqueous solution comprises hydrochloric acid.

7. The process as defined in claim 1 further characterized in that said salt is aluminum chloride.

8. The process as defined in claim 2 further characterized in that said salt is aluminum chloride.

9. A process for the conversion of hydrocarbon oil heavier than gasoline which comprises contacting the oil under cracking conditions with a catalyst produced by acidifying an alkali metal silicate solution to form silica gel, purifying the resultant alkali metal-containing silica by washing thereof with an aqueous solution of a compound having a cation capable of replacing alkali metal ions, separating the silica from the washing solution, thereafter commingling the thus purified silica in undried condition with an aluminum salt solution and depositing aluminum oxide on the silica by hydrolysis of said salt, and drying the resultant silica-alumina composite to remove the major portion of its water content.

10. A process for the conversion of hydrocarbon oil heavier than gasoline which comprises contacting the oil under cracking conditions with a catalyst produced by acidifying an alkali metal silicate solution to form silica gel, purifying the resultant alkali metal-containing silica by washing thereof with an aqueous solution of a compound having a cation capable of replacing alkali metal ions, separating the silica from the washing solution, thereafter commingling the thus purified silica in undried condition with an aqueous solution of a hydrolyzable aluminum salt and heating the mixture sufficiently to deposit alumina on the silica, and drying the resultant silica-alumina composite to remove the major portion of its water content.

CHARLES L. THOMAS.
JACOB E. AHLBERG.